US010179319B2

(12) United States Patent
Long et al.

(10) Patent No.: US 10,179,319 B2
(45) Date of Patent: Jan. 15, 2019

(54) MANGANESE OXIDE NANOARCHITECTURES FOR BROAD-SPECTRUM REMOVAL OF TOXIC GASES IN AIR-FILTRATION APPLICATIONS

(71) Applicant: The United States of America, as represented by the Secretary of the Navy, Washington, DC (US)

(72) Inventors: Jeffrey W. Long, Alexandria, VA (US); Jean M. Wallace, Bristow, VA (US); Gregory W. Peterson, Belcamp, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/383,938

(22) Filed: Dec. 19, 2016

(65) Prior Publication Data
US 2017/0197197 A1    Jul. 13, 2017

Related U.S. Application Data

(60) Provisional application No. 62/276,348, filed on Jan. 8, 2016.

(51) Int. Cl.
| | |
|---|---|
| *B01D 53/52* | (2006.01) |
| *B01J 20/04* | (2006.01) |
| *B01D 53/58* | (2006.01) |
| *B01D 53/50* | (2006.01) |
| *B01J 20/06* | (2006.01) |
| *B01J 20/28* | (2006.01) |
| *B01J 20/30* | (2006.01) |

(52) U.S. Cl.
CPC ............ *B01J 20/041* (2013.01); *B01D 53/50* (2013.01); *B01D 53/52* (2013.01); *B01D 53/58* (2013.01); *B01J 20/06* (2013.01); *B01J 20/28047* (2013.01); *B01J 20/28083* (2013.01); *B01J 20/28085* (2013.01); *B01J 20/3071* (2013.01); *B01J 20/3085* (2013.01)

(58) Field of Classification Search
None
See application file for complete search history.

(56) References Cited

U.S. PATENT DOCUMENTS

| 5,112,796 A | 5/1992 | Iannicelli |
| 7,316,732 B2 | 1/2008 | Taylor et al. |
| 2011/0038771 A1 | 2/2011 | Buelow et al. |

FOREIGN PATENT DOCUMENTS

| CN | 101875013 | * 11/2011 |
| WO | 2012167280 | * 12/2012 |

OTHER PUBLICATIONS

Jacoby, Mitch. "Air Filters for the Face." Chemical & Engineering News 92.49 (2014): 34-38.
Mahato, T. H., et al. "Mesoporous manganese oxide nanobelts for decontamination of sarin, sulphur mustard and chloro ethyl ethyl sulphide." Microporous and Mesoporous Materials 132.1 (2010): 15-21.
Štengl, Václav, et al. "Mesoporous manganese oxide for warfare agents degradation." Microporous and Mesoporous Materials 156 (2012): 224-232.
Qu, Yi-Fan, et al. "The influence of Mn species on the SO 2 removal of Mn-based activated carbon catalysts." Applied Surface Science 282 (2013): 425-431.
Long, Jeffrey W., Rhonda M. Stroud, and Debra R. Rolison. "Controlling the pore-solid architecture of mesoporous, high surface area manganese oxides with the birnessite structure." Journal of non-crystalline solids 285.1 (2001): 288-294.
Long, Jeffrey W., et al. "Design of Pore and Matter Architectures in Manganese Oxide Charge-Storage Materials." Electrochemical and Solid-State Letters 3.10 (2000): 453-456.
Peterson, Gregory W., et al. "Multifunctional Purification and Sensing of Toxic Hydride Gases by CuBTC Metal-Organic Framework." Industrial & Engineering Chemistry Research 54.14 (2015): 3626-3633.
Mabayoje, Oluwaniyi, Mykola Seredych, and Teresa J. Bandosz. "Enhanced adsorption of hydrogen sulfide on mixed zinc/cobalt hydroxides: Effect of morphology and an increased number of surface hydroxyl groups." Journal of colloid and interface science 405 (2013): 218-225.
Giannakoudakis, Dimitrios A., and Teresa J. Bandosz. "Zinc (hydr) oxide/graphite oxide/AuNPs composites: Role of surface features in H 2 S reactive adsorption." Journal of colloid and interface science 436 (2014): 296-305.
Wang, Long-Jiang, et al. "Design of a Sorbent to Enhance Reactive Adsorption of Hydrogen Sulfide." ACS applied materials & interfaces 6.23 (2014): 21167-21177.

* cited by examiner

*Primary Examiner* — Sheng H Davis
(74) *Attorney, Agent, or Firm* — US Naval Research Laboratory; Stephen T. Humnius (57) ABSTRACT

High-surface-area, ultraporous manganese oxide (MnOx) xerogels and aerogels exhibit outstanding filtration performance for multiple, chemically distinct toxic gases, including ammonia, sulfur dioxide and hydrogen sulfide. These MnOx materials use multiple mechanisms for small molecule capture/catalysis including molecular sieving and oxidative decomposition, and function in a wide range of humidity conditions.

2 Claims, 12 Drawing Sheets

MANGANESE OXIDE NANOARCHITECTURES FOR BROAD-SPECTRUM REMOVAL OF TOXIC GASES IN AIR-FILTRATION APPLICATIONS

REFERENCE TO RELATED APPLICATION

This application is a non-provisional of, and claims priority to and the benefits of, U.S. Provisional Patent Application 62/276,348 filed on Jan. 8, 2016, the entirety of which is hereby incorporated by reference.

BACKGROUND

This disclosure concerns manganese oxide nanoarchitectures for broad-spectrum removal of toxic gases in air-filtration applications.

These sol-gel-derived manganese oxide (MnOx) nanoarchitectures exhibit broad-spectrum filtration activity at room temperature for multiple toxic industrial compounds (TICs) and chemical warfare agents (CWAs).

SUMMARY OF DISCLOSURE

Description

These sol-gel-derived manganese oxide (MnOx) nanoarchitectures exhibit broad-spectrum filtration activity at room temperature for multiple toxic industrial compounds (TICs) and chemical warfare agents (CWAs).

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

DETAILED DESCRIPTION OF THE INVENTION

This disclosure concerns manganese oxide nanoarchitectures as broad-spectrum removal of toxic gases in air-filtration applications.

It has been demonstrated that our sol-gel-derived manganese oxide (MnOx) nanoarchitectures exhibit broad-spectrum filtration activity at room temperature for multiple toxic industrial compounds (TICs) and chemical warfare agents (CWAs).

Manganese oxides are synthesized via the reaction of $NaMnO_4$ and fumaric acid to form monolithic gels of disordered Na-MnOx, which can be further cation-exchanged by acid rinsing to form more crystalline H-MnOx compositions.

For both Na-MnOx and H-MnOx forms, controlled pore-fluid removal yields either densified, yet still mesoporous, xerogels or low-density aerogels, prepared by supercritical-$CO_2$ drying. Using dynamic-challenge microbreakthrough test protocols, we show that coarse-powder forms of these MnOx nanoarchitectures serve as highly effective filtration media for three chemically distinct TICs-$NH_3$, $SO_2$, and $H_2S$-chemicals that are classified in the "high hazard" category on the "TIC Hazard Index List" published by the U.S. Occupational Safety and Health Administration.

High filtration capacities are observed under both dry and wet (80% relative humidity, RH) atmosphere conditions.

These same MnOx materials also exhibit activity for the removal of sulfur-mustard agents and the CWA simulant, dimethylmethylphosphonate (DMMP).

Such manganese oxides offer multiple mechanisms for filtration/sorption of toxic agents—molecular sieving (for $NH_3$); chemisorption (for DMMP); and oxidative decomposition (for $SO_2$ and $H_2S$) to yield such innocuous byproducts as sulfate.

The ability to achieve high-capacity sorption and strong binding for multiple types of TICs and CWAs using a single sorbent material (MnOx in this case) will ultimately reduce the complexity, size, and cost of filtration technologies for such critical applications as respirators.

Manganese oxides (MnOx) comprise a large family of naturally occurring and synthetic materials that are of interest for applications ranging from electrochemical energy storage to catalysis. Many crystalline polymorphs of MnOx are constructed of $MnO_6$ octahedra that assemble into inherently microporous forms of either tunnel (e.g., hollandite) or layered (e.g., birnessite) structures, a characteristic that enables their use as molecule- and ion-sieving sorbents. Hollandite- and birnessite-type MnOx structures readily incorporate gas-phase $NH_3$ within their microporous structures to provide filtration activity for a TIC that is ordinarily difficult to capture due to its high vapor pressure.

In addition to physical capture, many forms of manganese oxides are catalytically active for oxidation reactions, enabled by facile interconversion of Mn oxidation state (e.g., between +3 and +4) and the rich defect chemistry that is available in nonstoichiometric MnOx compositions. For example, MnOx substrates effectively promote the oxidation of formaldehyde, another TIC for which abatement strategies are desired. More recent investigations have shown that some forms of MnOx adsorb/degrade certain chemical warfare agents (CWAs) and simulants such as sulfur mustard and 2-chloro-ethyl ethyl sulfide.

Materials designed for air filtration require not only reactive or sorptive functionality but also amplified surface areas that are readily accessible to the gas-phase agents of interest.

Here, such properties are achieved with MnOx materials synthesized via sol-gel chemistry and based on the reaction of aqueous permanganate with an organic reducing agent (e.g., fumaric acid) to form monolithic MnOx gels. Removal of the pore-filling fluid (e.g., $H_2O$) of the wet gel under ambient-pressure conditions yields moderately dense MnOx xerogels, while pore-fluid exchange and supercritical extraction with $CO_2$ produces low-density MnOx aerogels. Manganese oxide xerogels and aerogels possess through-connected networks of mesopores (in the case of xerogels) and/or small macropores (in the case of aerogels) that facilitate the long-range transport of gas-phase molecules to access the extensive interior surface areas (>200 $m^2$ $g^{-1}$) of these nanoarchitecture, even under high humidity conditions.

When combined with the sieving and/or catalytic activity of particular MnOx phases, these structural characteristics enhance performance in air-filtration applications.

EXAMPLE

Figure 1:
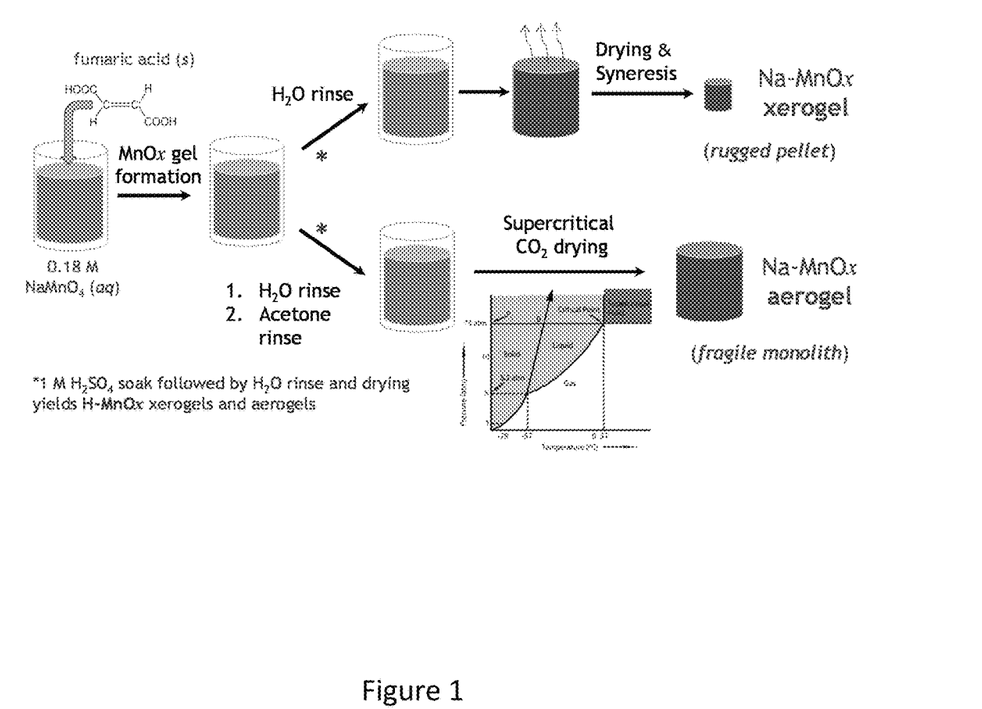
FIG. 1 is a schematic showing synthesis of MnOx xerogels and aerogels.

MnOx gels were prepared via established sol-gel chemistry methods. FIG. 1 illustrates a preparation method.

A 1:3 mole ratio of fumaric acid was added to a filtered 0.18 M $NaMnO_4$ aqueous solution with stirring; this mixture was degassed under vacuum for 8 minutes to remove evolving $CO_2$.

The resulting MnOx sol was poured into polypropylene molds, and the tops of the molds sealed with Parafilm, followed by aging overnight.

The resulting MnOx gels were removed from the molds, and rinsed for 2 days in several aliquots of water.

For the purposes of this study, MnOx nanoarchitectures were prepared in four variations that include xerogel and aerogel forms of MnOx gels either processed with only $H_2O$ rinsing (a composition designated hereafter as "Na-MnOx") or rinsed in 1 M $H_2SO_4$ after initial synthesis to exchange $Na^+$ for $H^+$ (compositions noted as "H-MnOx").

Following the rinsing steps, dry xerogels are prepared by ambient-pressure evaporation of $H_2O$ from the wet gel; capillary forces that arise during drying result in significant densification (factor of ~8-10) to produce durable monolithic pellets (Na-MnOx and H-MnOx xerogels are visibly indistinguishable at this point).

Aerogels are prepared by rinsing $H_2O$-filled gels with acetone for 2 days followed by $CO_2$ supercritical extraction (Polaron E3000 Series Critical Point Drying Apparatus).

The resulting aerogels retain the approximate dimensions of the wet gel; as a consequence of minimal densification, MnOx aerogels, although monolithic, are relatively fragile when handled.

As demonstrated herein, the low-density aerogel architecture provides higher mass-normalized TIC-filtration capacities in some cases, but when normalized to volume occupied by the powdered sorbent, the densified xerogel forms will provide better and superior performance. The ambient-pressure drying process for xerogels is also more economically attractive for large-scale production.

These MnOx nanoarchitectures are distinctive in that specific surface area for xerogels is comparable to those for the supercritically dried aerogels, whereas with other sol-gel-derived metal oxides, the capillary forces that arise during ambient-pressure drying to form xerogels results in coalescence of the networked oxide particles and loss of surface area.

Figure 2:
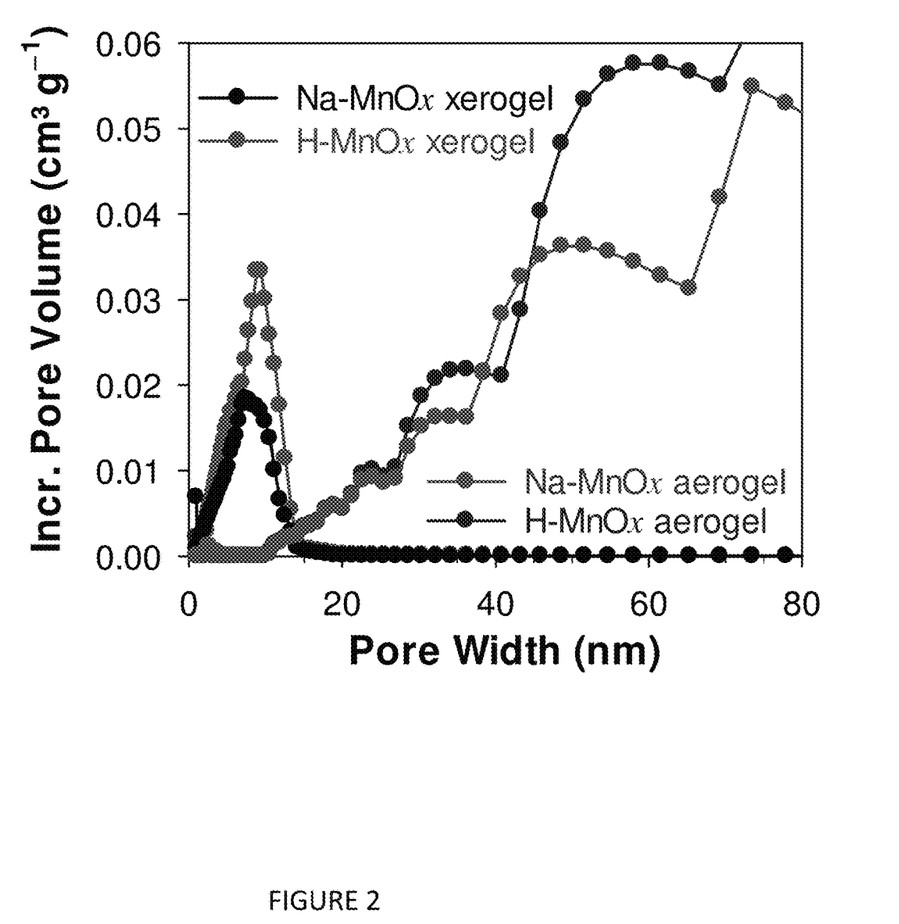
FIG. 2 illustrates pore-size distribution plots derived from $N_2$-sorption isotherms for MnOx xerogels and aerogels.

For example, MnOx xerogels and aerogels studied herein have comparable specific surface areas in the 240-290 $m^2$ $g^{-1}$ range, as determined by $N_2$-sorption analysis. Pore-size distribution plots derived from $N_2$-sorption isotherms show the distinctions in pore-solid architecture—xerogels have their void volume expressed within a narrow 2-15 nm size range, whereas the pores in the aerogels span 10-80 nm in size (FIG. 2).

Cumulative pore volumes for aerogels are ~4-5 times greater than for xerogels (Table 1), evidence of the degree of pore collapse that occurs during ambient-pressure drying to form the xerogel. Despite this densification, the Na-MnOx and H-MnOx xerogels have pore volumes of 0.34 and 0.50 $cm^3$ $g^{-1}$, respectively; such values are comparable to those of activated carbon-based sorbents.

TABLE 1

Summary of results from $N_2$-physisorption measurements.

| | Specific surface area ($m^2$ $g^{-1}$) | Cumulative pore volume ($cm^3$ $g^{-1}$) | Mean pore size (nm) |
|---|---|---|---|
| Na—MnOx xerogel | 263 | 0.34 | 5.3 |
| H—MnOx xerogel | 289 | 0.50 | 6.1 |
| Na—MnOx aerogel | 264 | 1.9 | 28 |
| H—MnOx aerogel | 246 | 2.4 | 40 |

Figure 3:
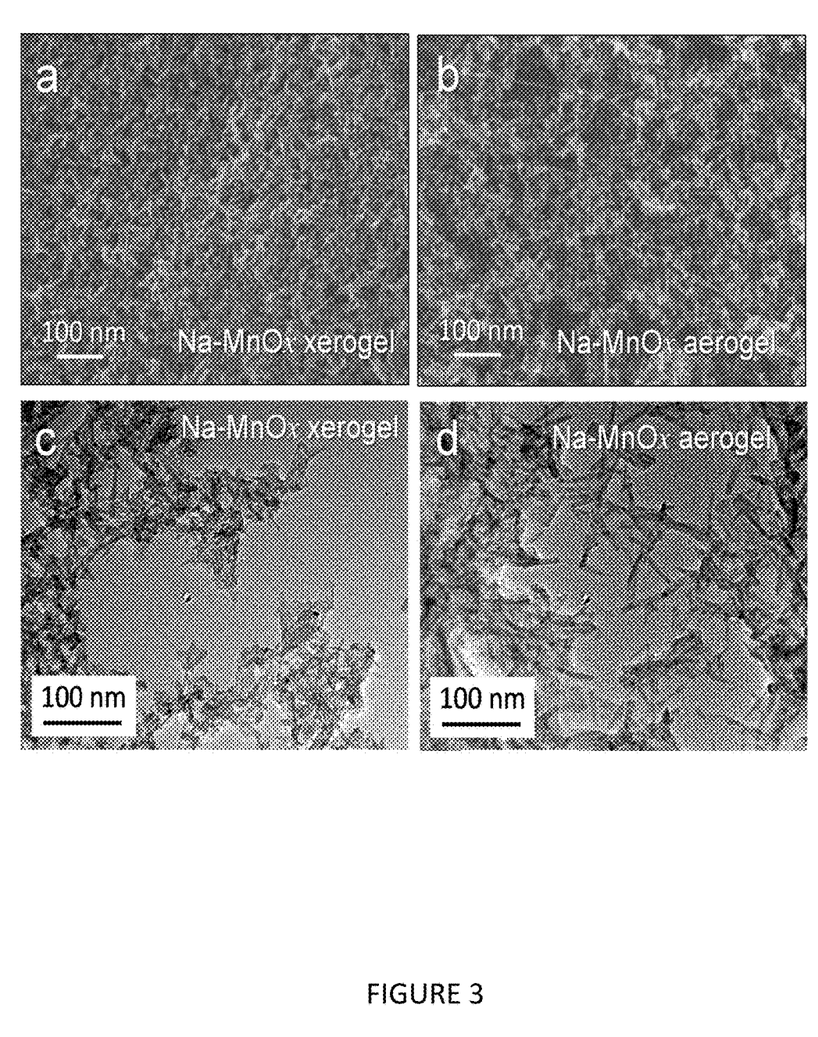
FIG. 3 illustrates scanning electron micrographs of (a) Na-MnOx xerogel and (b) Na-MnOx aerogel; and transmission electron micrographs of (c) Na-MnOx xerogel and (d) Na-MnOx aerogel.

Scanning electron microscopy confirms the 3D-porous nature of these MnOx materials. While the aerogels exhibit the most open architectures (FIG. 3b), even the xerogels, which experience significant densification and pore collapse during drying, retain a sponge-like structure with void sizes up to ~20 nm (FIG. 3a).

The solid MnOx domains comprise filament- or needle-like particle morphologies, as commonly observed with sol-gel derived MnOx. The networked nanoscale morphology of MnOx xerogels and aerogels is best shown by TEM (FIGS. 3c and 3d). The Na-MnOx xerogels are relatively ill-defined, whereas lattice fringes are more clearly observed in micrographs for the H-MnOx form, and the Na-MnOx and H-MnOx aerogels. The TEM images show oblong particles that are approximately 3-5 nm by 25-40 nm. It is suggested that the needle-like morphology of the MnOx domains, when expressed in 3-D networked architectures, prevents complete collapse of the initial pore structure of the wet MnOx gel that might otherwise occur due to the strong capillary forces that develop during ambient-pressure drying to form the xerogel.

Figure 4:
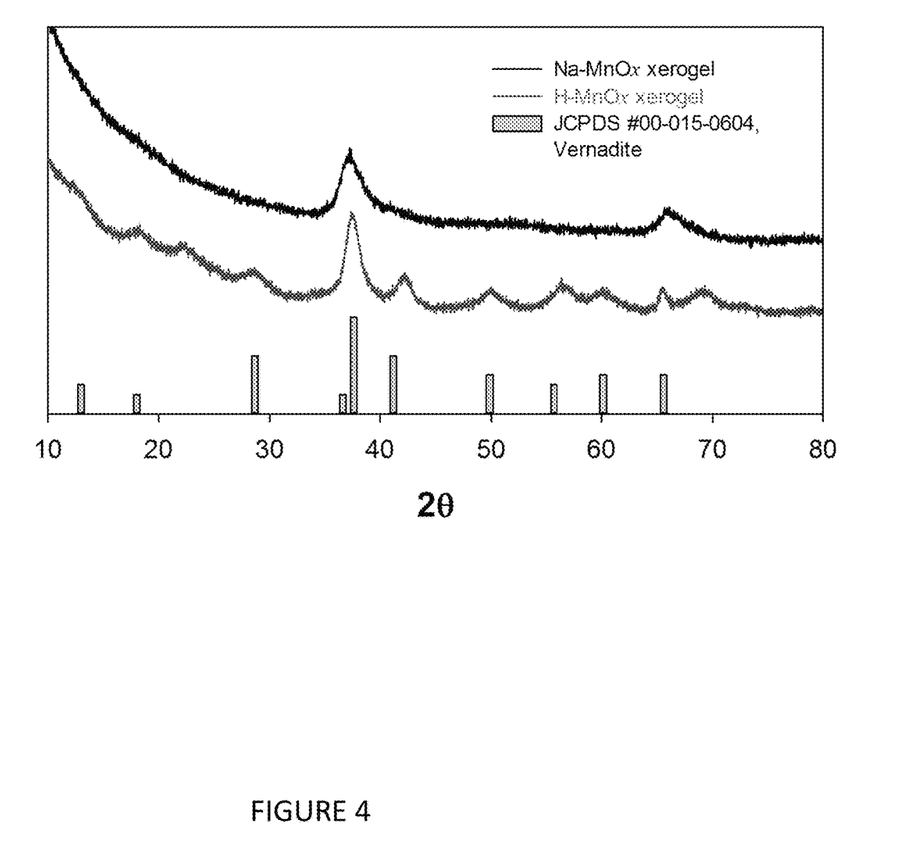
FIG. 4 illustrates powder X-ray diffraction scans for (a) Na-MnOx xerogel and (b) H-MnOx xerogel.

X-ray diffraction (FIG. 4) confirms that the Na-MnOx forms are poorly crystalline, with only two broad peaks at 38 and 66° 2-theta; the lack of crystallinity is not unexpected for sol-gel-derived materials that have not been thermally treated.

Acid-rinsing of the wet MnOx gel to form H-MnOx ultimately generates a modestly more crystalline material upon drying. The H-MnOx form exhibits multiple broad diffraction peaks in the diffraction scan that index most closely to vernadite ($\delta$-MnO$_2$), a turbostratic relative of the layered birnessite-MnOx structure. X-ray photoelectron spectroscopy confirms that these oxides exist in mixed-valent Mn$^{3+/4+}$ forms, with an average oxidation state of 3.4 for Na-MnOx and 3.5 for H-MnOx. This characteristic is critical for promoting oxidative-decomposition mechanisms.

Figure 5:
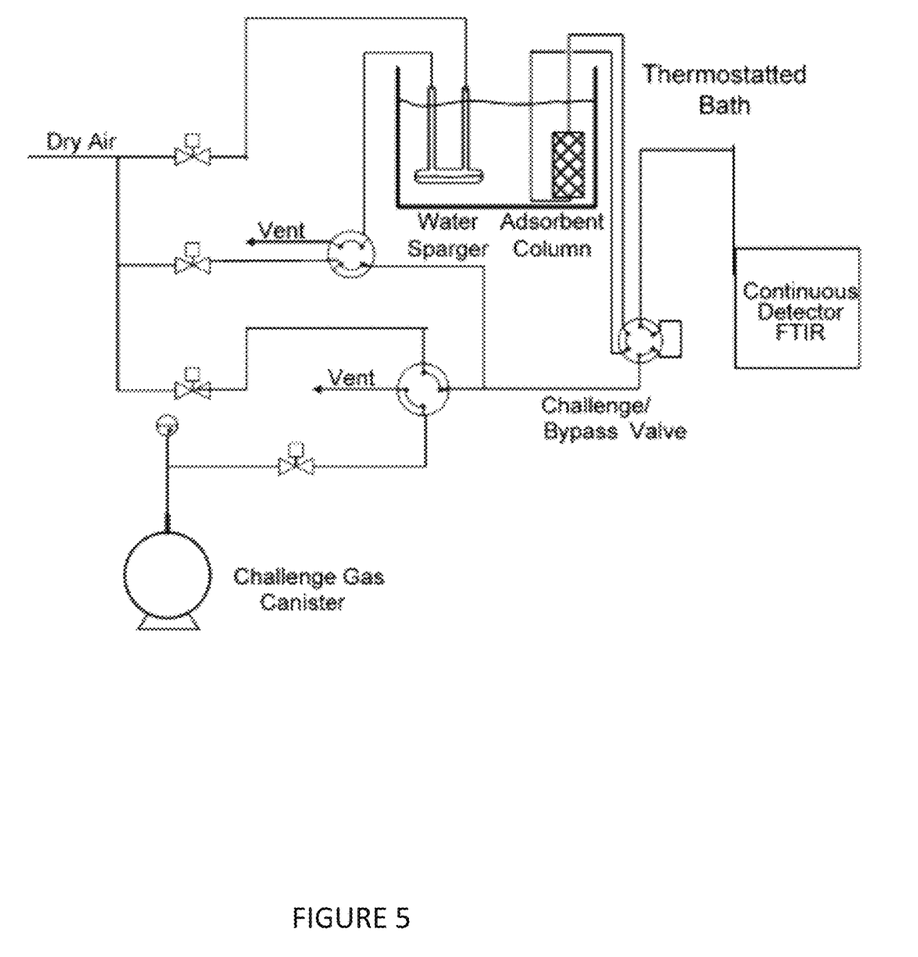
FIG. 5 is a schematic of an experimental set-up for dynamic-challenge microbreakthrough tests.
Figure 6:
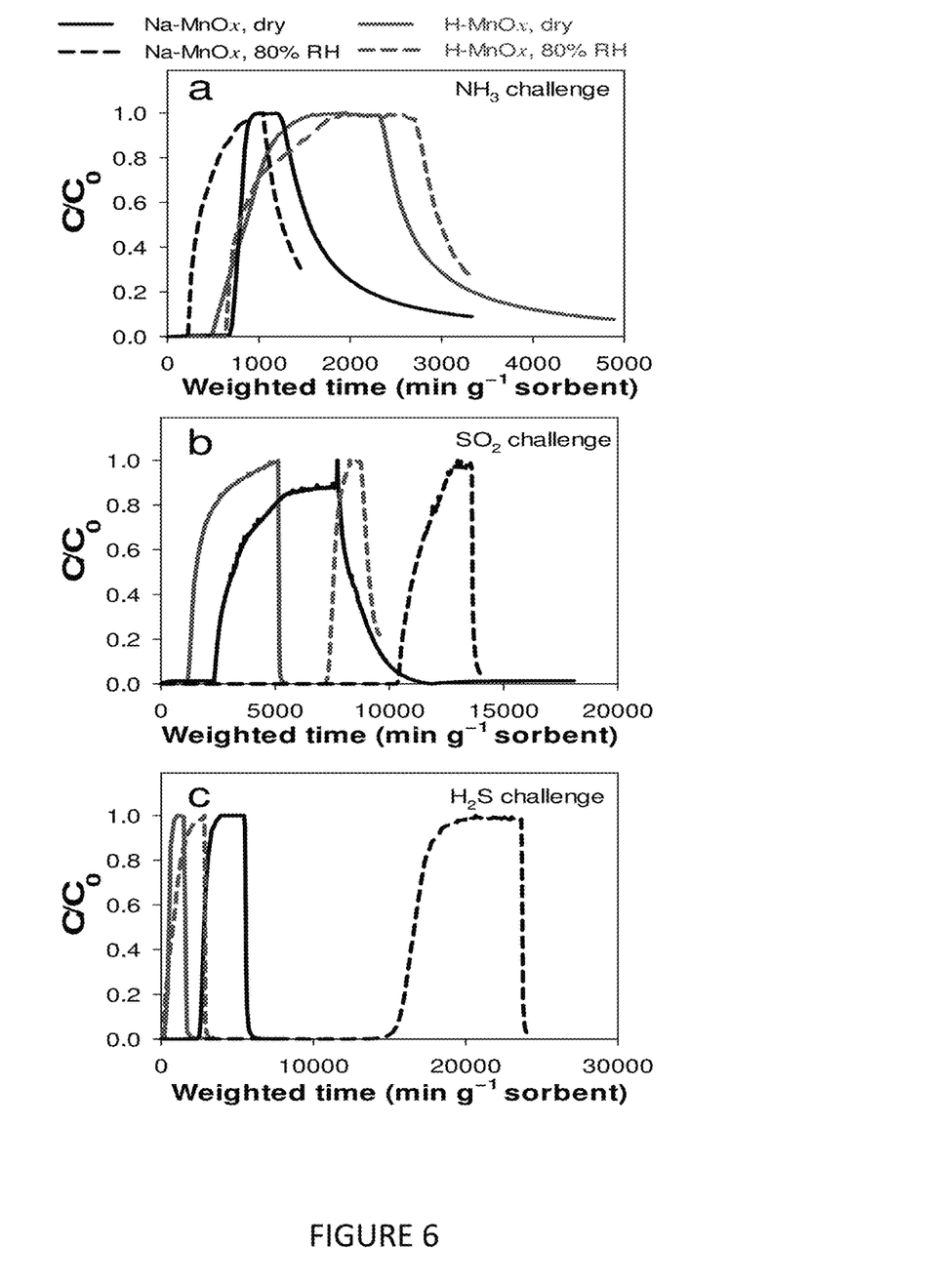
FIG. 6 illustrates Breakthrough curves for (a) $NH_3$; (b) $SO_2$; and (c) $H_2S$ challenge, under both dry and 80% relative humidity conditions and examining Na-MnOx and H-MnOx xerogel sorbents.

Breakthrough testing was conducted on MnOx aerogel and xerogel powders using a microbreakthrough setup that has been described previously (FIG. 5). Briefly, each chemical (TIC) was sampled via syringe from a neat cylinder, and delivered to a steel ballast, which was then pressurized to approximately 15 psig. A stream from this ballast was delivered via mass flow controller and mixed with a humidity-controlled stream at rates necessary to achieve the appropriate challenge concentration (2,000 mg/m$^3$ for NH$_3$, 1,000 mg/m$^3$ for H$_2$S and SO$_2$). The mixed stream was delivered at a total flow rate of 20 ml/min to a glass-fritted tube submerged in a temperature controlled bath at 20° C. Within the 4 mm ID tube, xerogels and aerogels were packed to a bed depth of approximately 4 mm, resulting in a residence time of approximately 0.15 s. Breakthrough was measured on the effluent side of the bed using HP5890 Series II gas chromatographs, one equipped with a photoionization detector for NH$_3$, and the other a flame photometric detector for H$_2$S and SO$_2$. Sorption capacities for NH$_3$, SO$_2$, and H$_2$S under dry and humid conditions, and for each of the four MnOx materials examined is are summarized in Table 2. Corresponding breakthrough curves are shown in FIG. 6.

Figure 7:
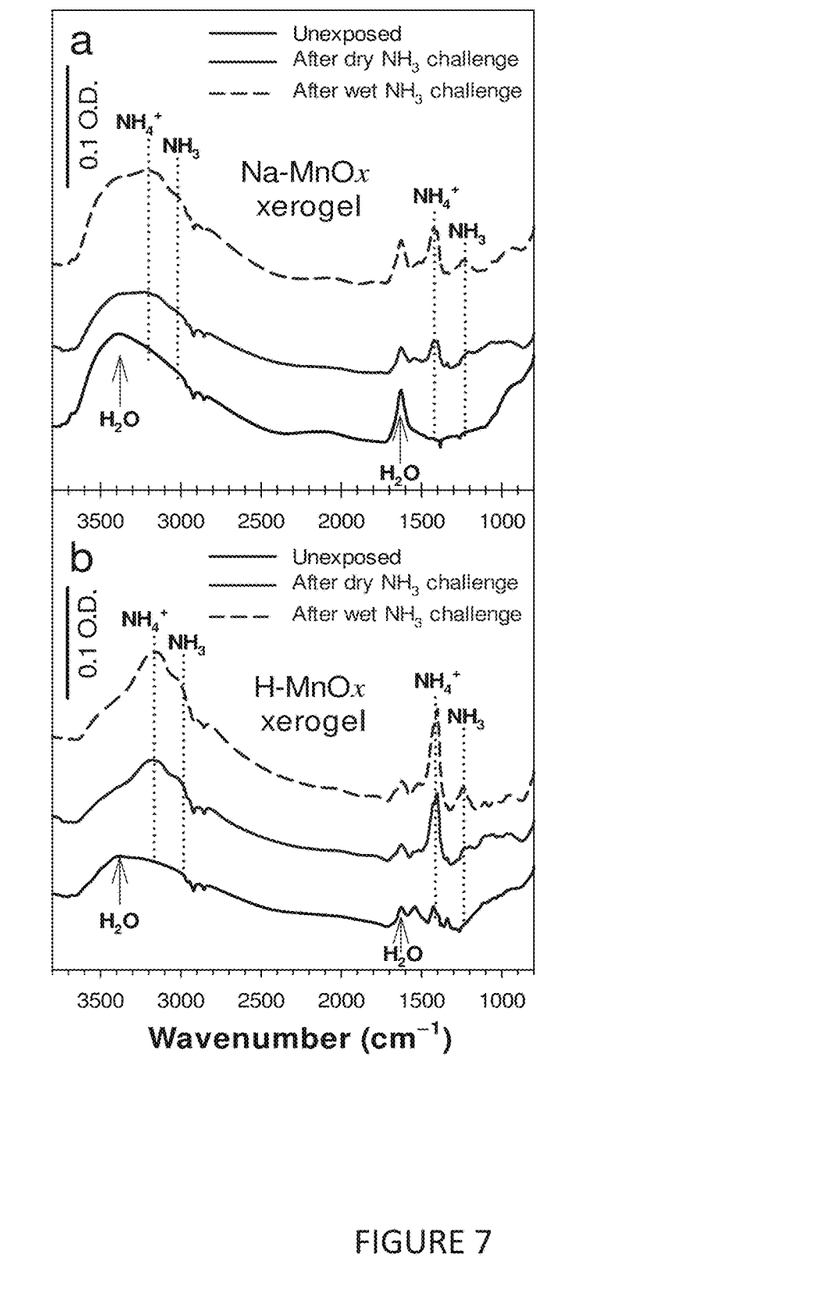
FIG. 7 illustrates diffuse-reflectance Fourier-Transform infrared spectra for (a) Na-MnOx and (b) H-MnOx xerogels after exposure to $NH_3$ under both dry and 80% RH conditions.
Figure 8:
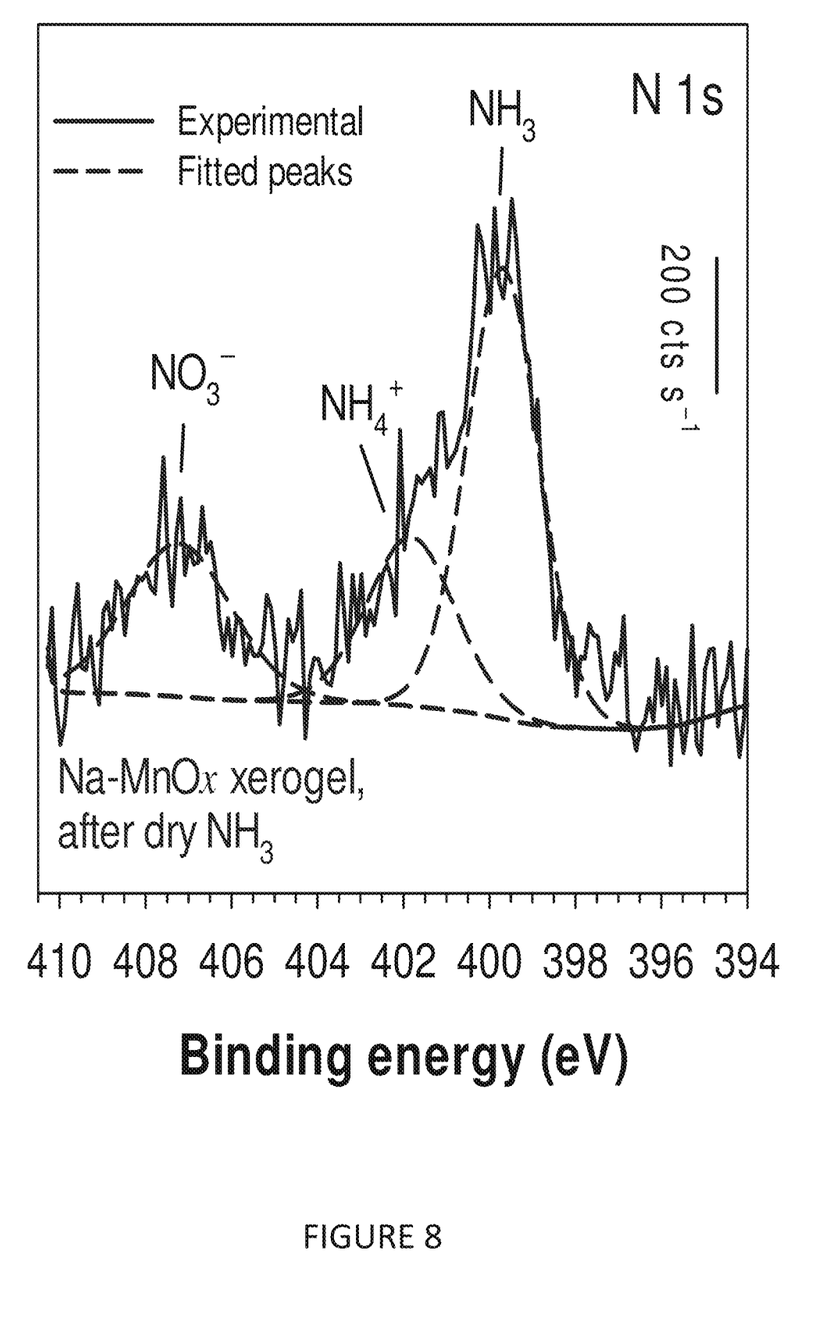
FIG. 8 is an X-ray photoelectron spectrum in the N 1s region for Na-MnOx xerogel exposed to $NH_3$ under dry conditions.

Using room-temperature dynamic-challenge test conditions, these MnOx xerogels and aerogels exhibit NH$_3$-sorption capacities ranging from 1.0-4.8 mol kg$^{-1}$, achieved via a combination of physisorption and chemisorption/sieving mechanisms. Ammonia sorption under 80% relative humidity (RH) was generally lower, potentially due to competition between NH$_3$ and H$_2$O for sorption sites, but capacity is still competitive even under these wet conditions. For comparison, Wang et al. used equilibrium adsorption measurements at 298 K (nominally dry conditions) to mea-sure "static irreversible" NH$_3$ capacities of 1.27 and 0.59 mol kg$^{-1}$ for H-hollandite and K-hollandite MnOx, respectively. Observed here is some NH$_3$ desorption after feed termination for the MnOx sorbents, indicating that at least a portion the NH$_3$ is weakly physisorbed. Yet, post-breakthrough characterization of NH$_3$-exposed MnOx using diffuse-reflectance infrared Fourier transform spectroscopy (DRIFTS) and X-ray photoelectron spectroscopy (XPS) indicates that a significant fraction of NH$_3$, and its protonated form, NH$_4^+$, are strongly retained within the MnOx structure (FIG. 7,8).

Figure 9:
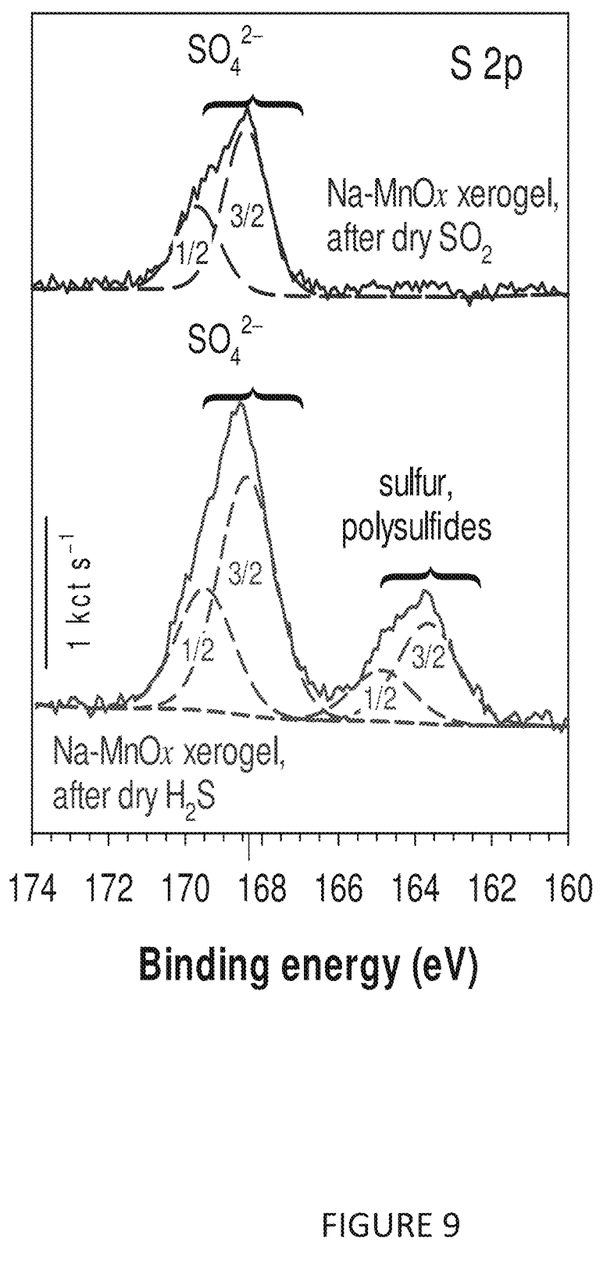
FIG. 9 is an X-ray photoelectron spectrum in the S 2p region for Na-MnOx xerogel exposed to either $SO_2$ or $H_2S$ under dry conditions.

The MnOx xerogel and aerogel nanoarchitectures also show significant activity for SO$_2$ removal at room temperature via oxidative mechanisms that convert this TIC to innocuous adsorbed sulfate, SO$_4^{2-}$ (see XPS in FIG. 9). Sorption capacities range from 0.6 mol kg$^{-1}$ for the H-MnOx gels under dry conditions to a high of 3.5 mol kg$^{-1}$ for the Na-MnOx xerogel under humid conditions (FIG. 6b and Table 2), and after feed termination no elution of SO$_2$ is observed, indicating strong retention/conversion. In all cases, Na-MnOx compositions exhibit higher SO$_2$ capacities, a trend that may be due to the lower average Mn oxidation state of that form.

Capacities obtained at 80% RH are significantly greater than for dry conditions, in agreement with previous reports. For comparison, Yi-Fan et al. reported SO$_2$-sorption capacities as high as 1.5 mol kg$^{-1}$ for MnOx-containing activated carbons when studied by dynamic breakthrough protocols under humid conditions and with the sorbent bed maintained at 80° C. Manganese oxides have long been used to remove SO$_2$ from flue gas streams, but in such cases the MnOx sorbent/catalyst bed is typically operated at high temperatures (>200° C.). Our work demonstrates that nanostructured, mixed-valent MnOx are active for SO$_2$ oxidation/decomposition at room temperature. Post-exposure analysis shows that SO$_2$ is converted to adsorbed SO$_4^{2-}$ concomitant with an increase in the average Mn oxidation state.

TABLE 2

Summary of TIC sorption capacities from microbreakthrough tests.

| | NH$_3$ capacity | | SO$_2$ capacity | | H$_2$S capacity | |
| --- | --- | --- | --- | --- | --- | --- |
| | Dry | 80% RH | Dry | 80% RH | Dry | 80% RH |
| Na—MnOx xerogel | 1.9 mol kg$^{-1}$ (32 mg g$^{-1}$) | 1.0 mol kg$^{-1}$ (17 mg g$^{-1}$) | 1.0 mol kg$^{-1}$ (64 mg g$^{-1}$) | 3.5 mol kg$^{-1}$ (220 mg g$^{-1}$) | 1.7 mol kg$^{-1}$ (58 mg g$^{-1}$) | 9.9 mol kg$^{-1}$ (340 mg g$^{-1}$) |
| H—MnOx xerogel | 2.0 mol kg$^{-1}$ (34 mg g$^{-1}$) | 2.0 mol kg$^{-1}$ (34 mg g$^{-1}$) | 0.6 mol kg$^{-1}$ (38 mg g$^{-1}$) | 2.4 mol kg$^{-1}$ (150 mg g$^{-1}$) | 0.3 mol kg$^{-1}$ (10 mg g$^{-1}$) | 0.5 mol kg$^{-1}$ (17 mg g$^{-1}$) |
| Na—MnOx aerogel | 4.8 mol kg$^{-1}$ (82 mg g$^{-1}$) | 2.3 mol kg$^{-1}$ (39 mg g$^{-1}$) | 0.9 mol kg$^{-1}$ (58 mg g$^{-1}$) | 3.1 mol kg$^{-1}$ (200 mg g$^{-1}$) | 2.7 mol kg$^{-1}$ (92 mg g$^{-1}$) | 20 mol kg$^{-1}$ (680 mg g$^{-1}$) |
| H—MnOx aerogel | 2.6 mol kg$^{-1}$ (44 mg g$^{-1}$) | 1.2 mol kg$^{-1}$ (20 mg g$^{-1}$) | 0.6 mol kg$^{-1}$ (38 mg g$^{-1}$) | 2.7 mol kg$^{-1}$ (170 mg g$^{-1}$) | 0.4 mol kg$^{-1}$ (14 mg g$^{-1}$) | 0.5 mol kg$^{-1}$ (17 mg g$^{-1}$) |

Typical breakthrough curves for dynamic H$_2$S challenge are shown in FIG. 6c. Similar to our results for SO$_2$, effluent concentration immediately drops to the baseline after H$_2$S feed termination, indicating strong retention or conversion of H$_2$S to a nonvolatile product. Filtration of H$_2$S is more sensitive to the particular form of MnOx sorbent. Whereas the H-MnOx compositions show very little H$_2$S removal, Na-MnOx forms of both the aerogel and xerogel show outstanding reactivity, especially under humid conditions. The Na-MnOx xerogel exhibits capacities of 1.7 and 9.9 mol kg$^{-1}$ (58 and 340 mg g$^{-1}$) under dry and humid conditions, respectively, while the aerogel approximately doubles the removal capacity, with loadings of 2.7 and 20 mol kg$^{-1}$ (92 and 680 mg g$^{-1}$, respectively) under the same conditions.

Figure 10:
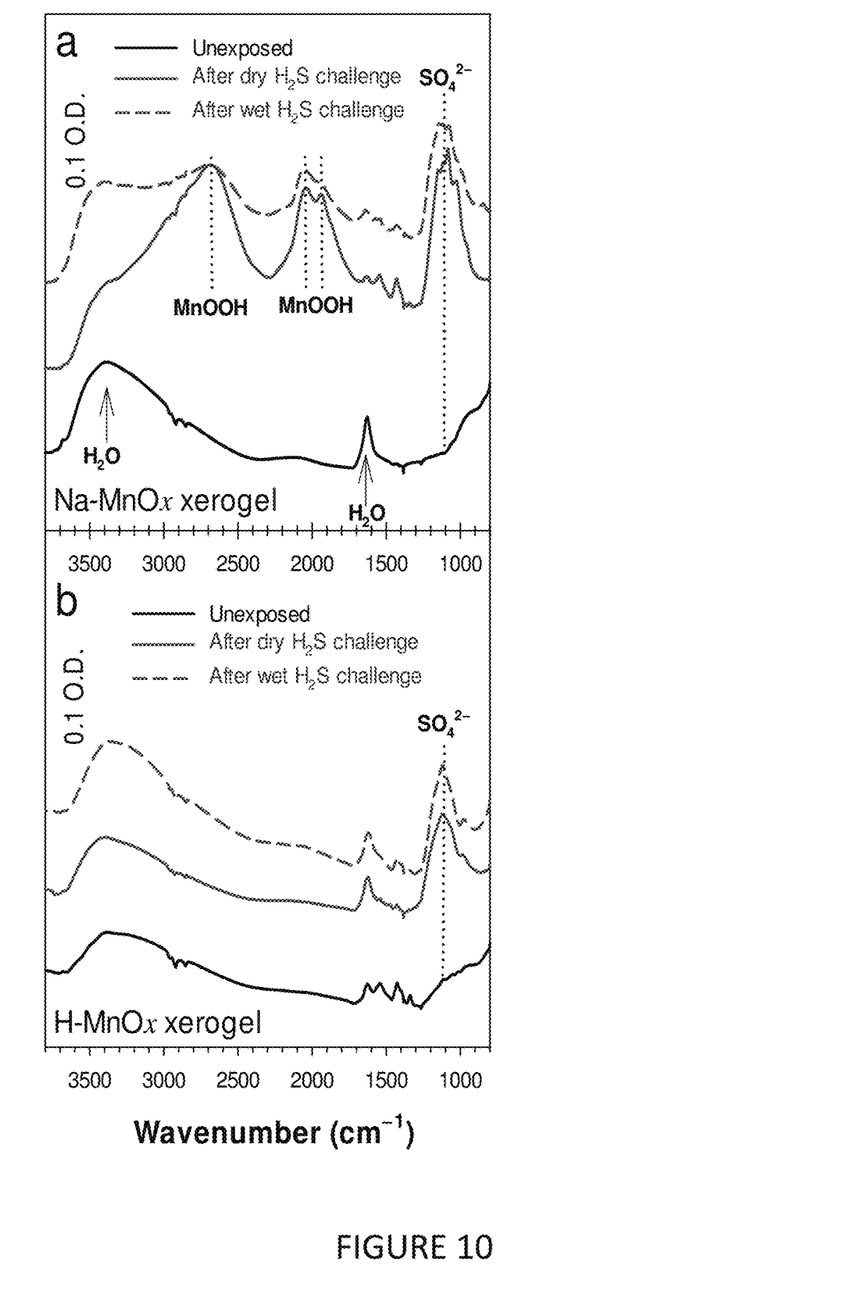
FIG. 10 illustrates diffuse-reflectance Fourier Transform infrared spectra for (a) Na-MnOx and (b) H-MnOx xerogels after exposure to $H_2S$ under both dry and 80% RH conditions.

Analysis of H$_2$S-exposed MnOx confirms that Hydrogen sulfide undergoes similar oxidative-decomposition mechanisms at MnOx to that observed with SO$_2$, yielding both sulfate and adsorbed sulfur/polysulfide byproducts, as determined by XPS (FIG. 9) and DRIFTS (FIG. 10). As part of the H$_2$S-decomposition process some of the mixed valent MnOx is converted to MnOOH (see FIG. 10), concomitant with a decrease in average Mn oxidation state to 3.1. The through-connected pore structure and high total pore volume of these MnOx xerogels and aerogels readily accommodate the formation of solid byproducts of H$_2$S decomposition, leading to high capacities. A general reaction scheme for the reactivity of Mn$^{IV}$O$_2$ with H$_2$S is shown below.

Prior formulations of manganese oxides have been successfully used for H$_2$S removal at high temperatures, but were generally less effective at room temperature and with loadings that do not approach those seen with the MnOx xerogels and aerogels. Recently, Peterson and co-workers examined broad-spectrum carbon, an excellent material for acidic, basic, and oxidizable gases, tested with the same microbreakthrough apparatus used herein reporting breakthrough capacity of approximately 8 and 3 mol kg$^{-1}$ for H$_2$S under dry and humid conditions, respectively, a dry-vs.-wet trend that is opposite of that seen with the MnOx materials, even though both materials remove H$_2$S via oxidation. Whereas water absorption under wet conditions may block active sites on the carbon sorbent, water actually acts synergistically to enhance the H$_2$S removal mechanism within the MnOx xerogels and aerogel materials. Further, the mesoporous/macroporous structure of these xerogels and aerogel architectures should minimize pore occlusion by capillary condensation of H$_2$O, which is often an issue with microporous sorbents.

Figure 11:
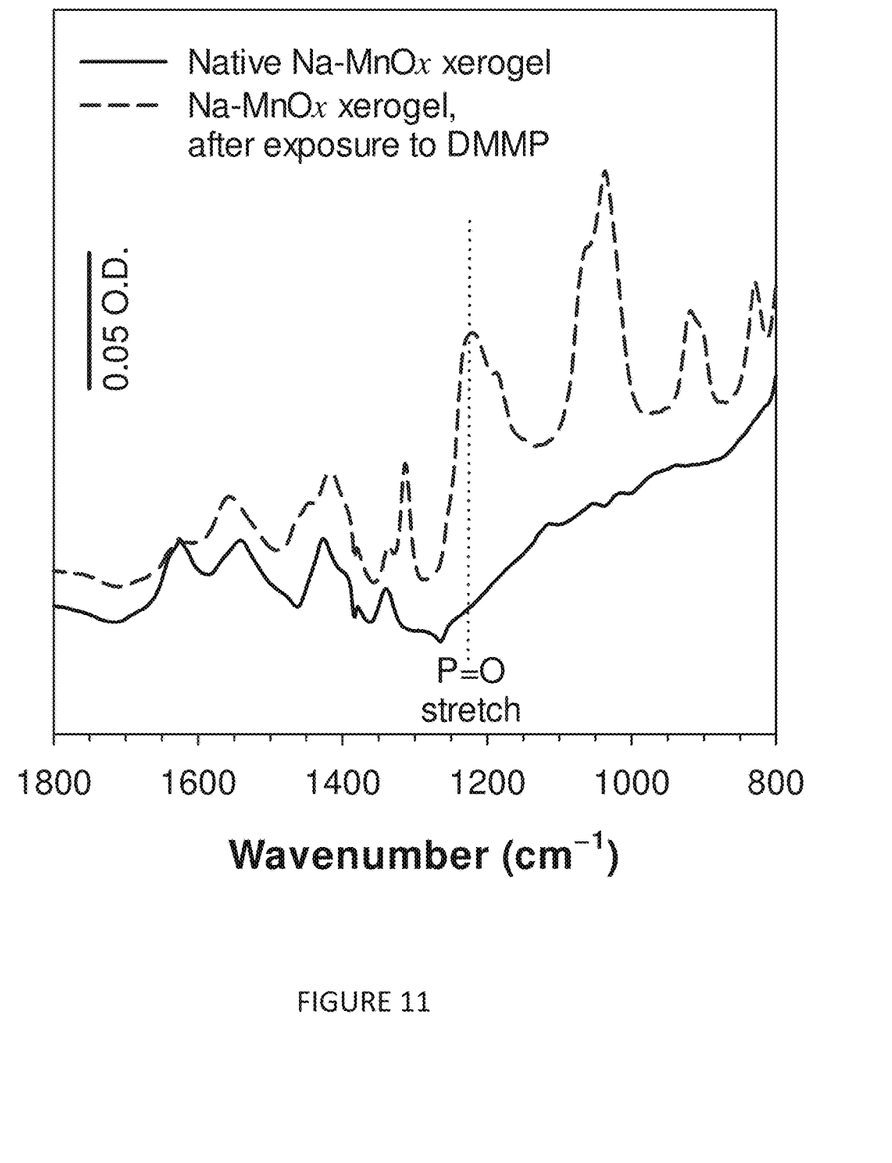
FIG. 11 illustrates diffuse-reflectance Fourier Transform infrared spectra for Na-MnOx xerogels powder in its native form (—) and after exposure to vapor-phase DMMP (---). The position of the P=O stretching band (1260 cm$^{-1}$) indicates that DMMP is strongly bound to the MnOx surface.

Having demonstrated high filtration activity for multiple TICs, we also investigated the sorption/capture of two CWA agents/simulants using these same MnOx nanoarchitectures. Dimethylmethylphosphonate (DMMP) is a common simulant for sarin and related nerve gases. We exposed Na-MnOx xerogels to vapor-phase DMMP at room temperature, followed by venting the DMMP-exposed Na-MnOx to remove any weakly bound DMMP. Analysis of the resulting Na-MnOx xerogels by DRIFTS confirms that DMMP is present on the MnOx sorbent at significant quantities. Although DMMP does not undergo chemical decomposition, the position of the P=O vibrational band indicates that DMMP is strongly adsorbed to the MnOx surface (FIG. 11). In another series of experiments, sulfur mustard (HD) was applied to MnOx sorbents at 5 wt. % agent loading, followed by extraction after 60 min. The Na-MnOx and H-MnOx xerogels showed 36% and 47% HD removal, respectively, values that surpass those of many other common filtration materials.

The MnOx xerogels and aerogels described herein provide highly effective filtration performance against a broad range of TICs and CWAs, all in a single sorbent material.

Achieving such broad-spectrum protection often requires the use of multiple distinct sorbents, or chemically complex composites, such as metal- and organic-doped carbons.

Figure 12:
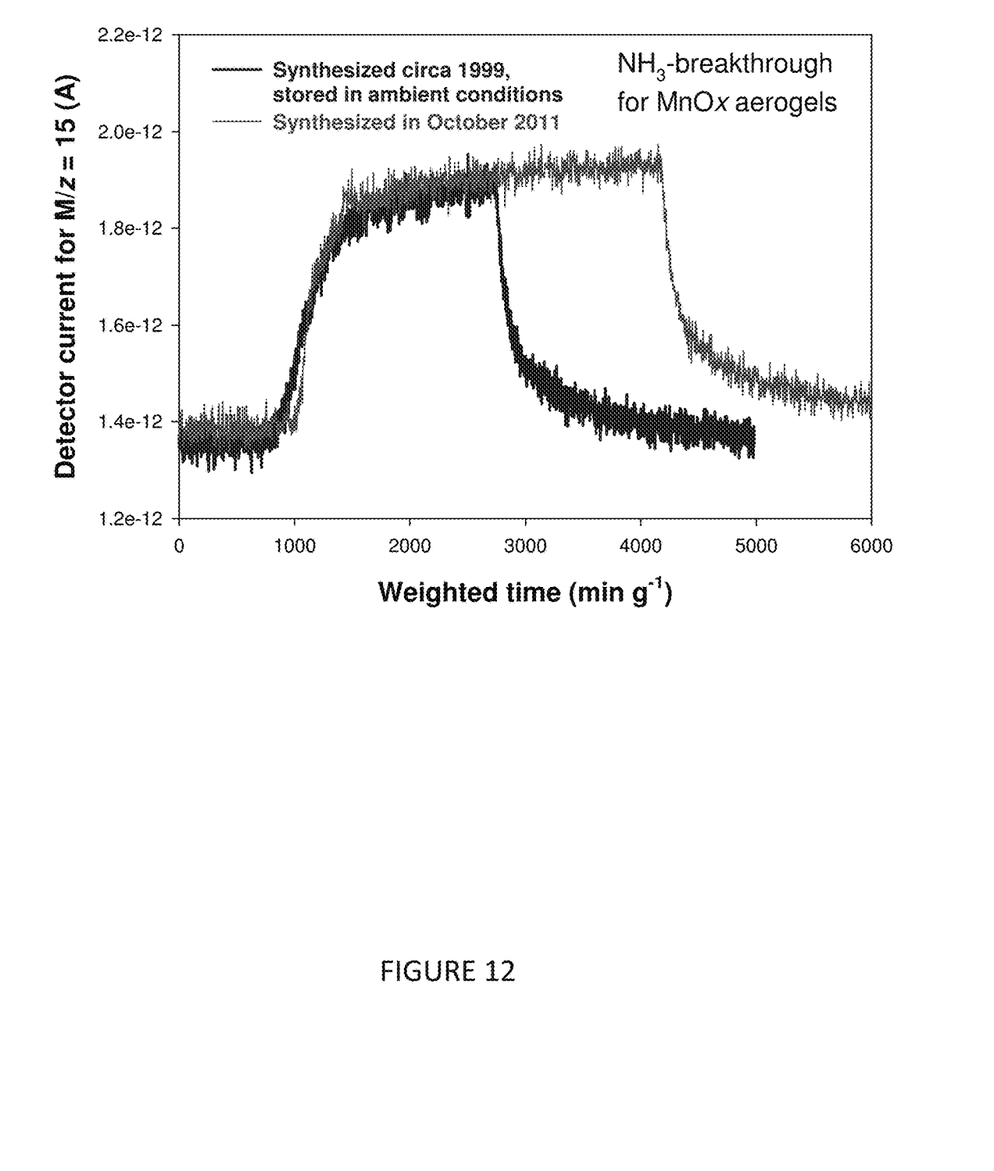
FIG. 12 illustrates Breakthrough curves for $NH_3$ challenge of MnOx aerogel powders. Ammonia-sorption capacity for MnOx stored for 12 years is comparable to that for a freshly synthesized and tested MnOx powder (Tests performed in November 2011).

The mesoporous/macroporous structures inherent to MnOx xerogels and aerogels support rapid flux of gas/vapor-phase agents to active sites within the materials, while also minimizing flooding/occlusion under high-humidity conditions. In addition to capture by sieving (for NH$_3$) and chemisorption (for DMMP), the ability of mixed-valent Mn$^{3+/4+}$-oxide compositions to readily undergo Mn oxidation state changes, either positively or negatively, facilitates redox reactions at the MnOx surface that promote oxidative decomposition (e.g., for SO$_2$ and H$_2$S). The nanoscale nature of these MnOx materials enables reactivity at room temperature, whereas prior examples of MnOx sorbents/catalysts were operated at elevated temperatures. We have also demonstrated that MnOx nanoarchitectures exhibit excellent shelf-life, with filtration performance unaffected even after more than a decade of storage (see FIG. 12). Xerogel forms of MnOx offer the added benefits of mechanically rugged structures, as well as superior volume-normalized performance when used in a powder-bed filter configuration.

Various other porous materials are used for the removal and reaction of toxic chemicals. Activated carbons are typically impregnated with metal salts to react with acidic and basic gases; however, deleterious effects are often seen due to neutralization over time. Metal-organic frameworks (MOFs) have been developed to remove compounds such as ammonia and sulfur dioxide, but only a very small subset, mainly M-MOF-74 analogs, exhibit broad spectrum removal capabilities. The MOF HKUST-1 is able to remove ammonia and hydrogen sulfide, but not sulfur dioxide. Like activated carbon, however, these examples also have limitations due to stability to ambient environments. Metal oxides other than oxides of manganese, such as zirconium hydroxide, zinc oxide, and alumina, have been developed in the past to remove toxic chemicals, yet these examples typically target specific groups of chemicals (e.g., acidic compounds), and not a broad range of chemistries. Similarly, metal oxides such as zirconium hydroxide, titania, alumina, and others have been investigated for reaction with chemical warfare agents; yet none of these compounds has shown the same ability to react with mustard.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What we claim is:

1. A method of filtering toxic gases, said method comprising:
adding fumaric acid to an aqueous solution of NaMnO$_4$ in a 1:3 mole ratio to form a fluid-filled porous gel of MnOx in which the oxide domains also contain Na$^+$ and thereby form Na-MnOx;
rinsing the Na-MnOx gel with an acid solution to protonate the oxide and form H-MnOx and remove Na$^+$; and
rinsing the gel in water to remove residual acid;
drying the fluid-filled porous gel under ambient-pressure conditions to generate a densified xerogel MnOx material;
wherein the manganese oxide nanoarchitecture has an interior surface area >200 m$^2$ g$^{-1}$;

wherein the MnOx gel has a void structure comprising pores that are sized from 2-150 nm;

exchanging the fluid in the pores of the fluid-filled porous gel for $CO_2$;

removing said $CO_2$ under supercritical conditions to render a dry, low-density MnOx aerogel;

exposing the low-density MnOx aerogel with a manganese oxide nanoarchitecture to a toxic gas and air mixture;

removing the toxic gas from the toxic gas and air mixture at room temperature via an oxidative mechanism that converts the toxic gas to an innocuous adsorbed substance;

removing ammonia from a contacting gas mixture at